Dec. 25, 1928.  
A. T. HESPE  
1,696,400  
PROCESS FOR MAKING THERMOMETER TUBES  
Filed Dec. 29, 1923
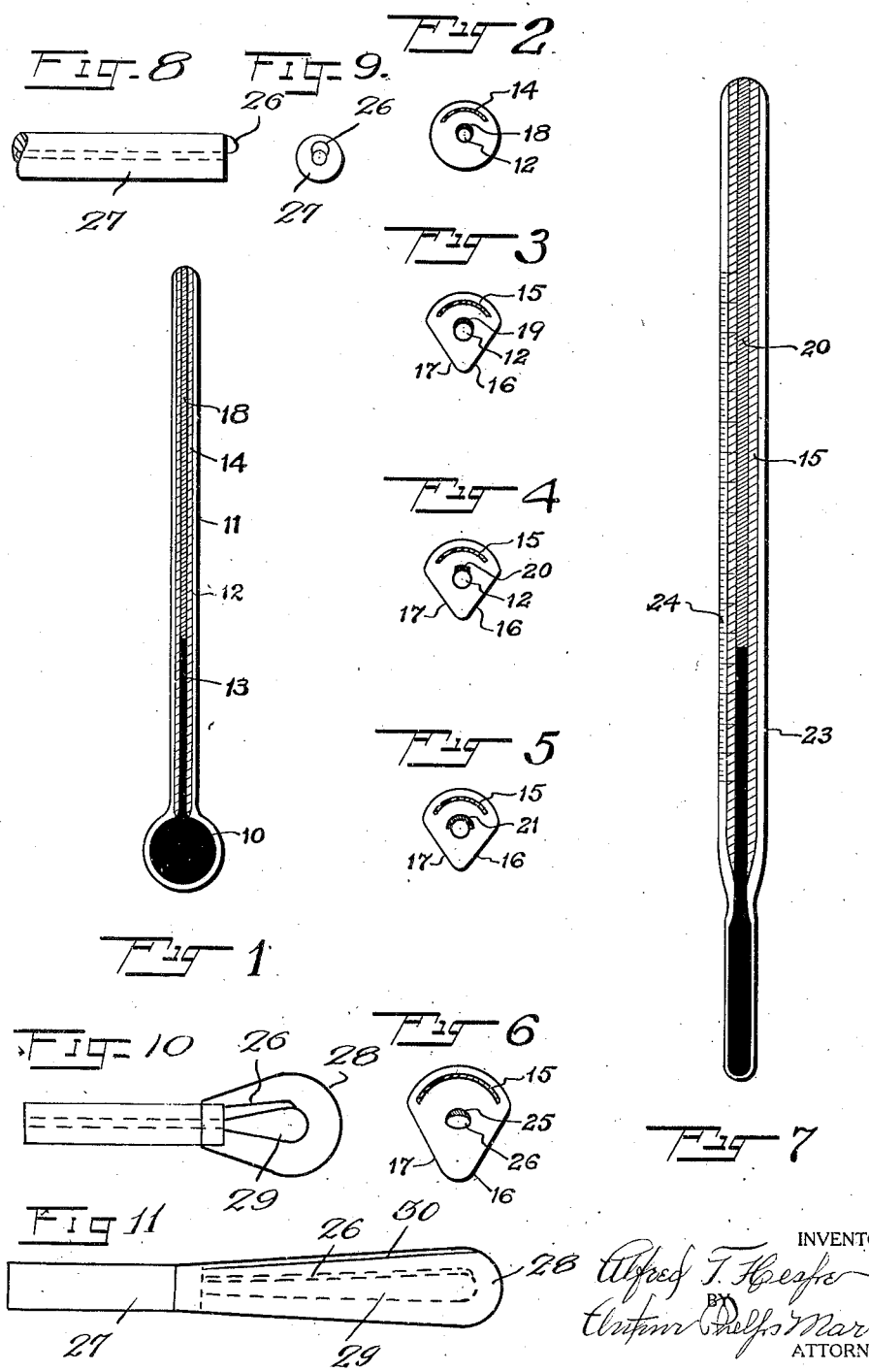

Patented Dec. 25, 1928.

1,696,400

UNITED STATES PATENT OFFICE.

ALFRED T. HESPE, OF EAST ORANGE, NEW JERSEY.

PROCESS FOR MAKING THERMOMETER TUBES.

Application filed December 29, 1923. Serial No. 683,406.

One of and probably the most trying operation or condition surrounding the use of thermometers is the rapid and accurate reading thereof or as it may be termed, the discovery of the location of the top of the mercury column.

After years of study and experimentation, thermometer manufacturers and users have concluded that the only expansible material or element that can be employed in thermometers with a satisfactory degree of efficiency is metallic mercury and that a thermometer tube must be made of particularly clear and brilliant glass.

The combination of mercury with clear glass makes it difficult at most times to discover the position of the mercury in the thermometer tube.

My invention consists in emphasizing the position of the mercury column, by causing the mercury to pass over a sharply contrasting surface. This surface may and preferably is backed up by a second contrasting surface, the result of which is to make the lens more readily discoverable. In the specification which follows, I will describe the arrangement and operation, which result in the accomplishment of the purposes and the accompanying drawing should be referred to for a complete understanding of the specification.

In the drawing:—

Fig. 1, shows in elevation, a thermometer tube.

Fig. 2, is an end view of a round tube or column.

Figs. 3, 4, 5 and 6 are end views of prismatic tubes.

Fig. 7, shows in elevation, a common form of clinical or industrial thermometer.

Fig. 8, shows a small section of a blow pipe with colored glass in position.

Fig. 9, is an end elevation of the blow pipe.

Fig. 10, shows the general condition when the first gather of glass has been added to the blow pipe.

Fig. 11, shows the general condition after the first elongation.

Similar reference numerals indicate like parts in all the figures where they appear.

In Fig. 1, at 10, I show a bulb of a thermometer and formed integral therewith or secured thereto is a glass tube 11, having a central perforation 12, through which the mercury 13 is free to pass.

An enlarged end view of this thermometer is shown in Fig. 2 and modifications thereof in Figs. 3 and 4. The broad cross-hatching is intended to indicate a longitudinal insert of colored glass, which is usually and preferably white, arranged as shown at 14 and intended to provide an opaque or light proof backing for the mercury column. It is not usual to make this backing strip entirely opaque, but nearly so, so that the light rays passing through this portion will be limited.

To make the position of the mercury more readily discoverable, I place adjacent to the perforation 12, in which the mercury rises and falls, a strip of colored glass or other suitable material shown at 18, 19, 20, 21 and 25 in the several figures.

At 18 in Fig. 1, this additional colored member is narrow, is in fact of a width not quite equal to the diameter of the bore or the perforation 12. Its color may be selected, but should, obviously, be a color sharply contrasting with the color of the mercury and that of the light shield 14 and also of a color different from that evidenced in the glass by reflected or refracted rays.

As shown in Fig. 1, the mercury rising in the perforation 12 conceals the colored member 18 by covering it, and from the observation side of the thermometer tube, it will appear that an additional means is provided for determining the accurate reading of the thermometer. The operator may read the top edge of the mercury column or the bottom edge of my colored strip 18 and while I realize that these two points are the same and that the apparent bottom edge of the strip 18 is produced by the movement of the mercury over the strip, I also know that it is much easier to discover the compound indicating line formed at the junction point between two substances of different color, than it is to discover the top of any member or thing extending into the atmosphere and particularly if a thing or substance be light of color or be colored white, gray or any other light color as previously set forth and it is common knowledge that the top edge of the thin mercury column in a thin glass tube is exceedingly difficult to discover.

My experiments have further shown me that my improvement makes possible the accurate use of a thermometer to persons of poor eye sight or persons to a more or less degree color blind and it is of course, well within the province of my device, to make the colors of the members 14, 15 and 18, so contrasting or such as to make the use of this thermometer possible with persons color blind to a marked degree or with persons having poor eye sight or to meet any peculiar conditions of sight.

A satisfactory procedure, according to my invention is the following:—

A piece of glass, preferably colored glass 26, but in any event of a contrasting color with respect to that of which the major part of the thermometer is constituted is first placed upon the end of the blow pipe 27 in such a position that when a bubble is subsequently formed in the glass by the use of the blow pipe, the colored glass will form or be closely adjacent to the one side of said bubble and to the back wall of the bore, which is later produced, care being taken that the colored glass retains its proper position during the various manipulations. It will be apparent that the colored glass referred to will constitute but a minor portion of the glass constituting the final thermometer tubing and that it will be melted in its position adjacent to the bore in a major portion of glass of contrasting color and joined to and bound on both sides by the glass constituting the major portion of the tubing. After the minor portion, consisting, as stated, preferably of colored glass, and having a dimension and location which is determined with reference to the bubble or bore, has been suitably associated with the end of the blow pipe as described, a suitable quantity of clear flint glass as shown at 28 is gathered on the end of the blow pipe and an air bubble is blown therein, adjacent to the minor colored glass portion. This bubble is what eventually becomes the bore of the thermometer tube. The first gathering is then elongated and the bubble 29 naturally follows the shape of the glass and becomes a long, thin bore in the center. The colored piece of glass is caused to follow the bore and to preserve substantially the same position in relation to the bore.

The elongated gather is then covered on one side only with a strip of white glass 30 and this entire mass is again covered with flint glass, whereupon the material is ready for drawing out to the required diameter. In drawing out the material to the required diameter, the colored glass piece, first mentioned, now permanently associated with the flint glass, becomes extended and elongated simultaneously with the extension and elongation of the bore. The procedure may, obviously, be varied with respect to many details, but the fundamental principle thereof, which will remain the same in all variations is that a small piece of colored glass is initially incorporated in a gather, in association with the bubble which ultimately becomes the bore of the tube, so that the colored strip and the bore are always extended simultaneously and in relation to each other.

This is a new principle in the art of the manufacture of thermometer glass tubing.

It will be understood that if a colored strip of glass is imbedded in the gather and the gather is then drawn out to the required length the colored strip becomes extended, merely by reason of the extension of the vitreous material, whereas, if the colored strip is initially associated with the bubble, which finally becomes the bore, it will be extended and its dimensions regulated generally by reason of the physical influences, which govern the shape and condition of the bore.

While modifications may be made, within the scope of the appended claims, I prefer the whole as shown and described.

Having carefully and fully described my invention, what I claim and desire to obtain by Letters Patent is:—

1. In the process of making thermometer tubing the steps which consist in uniting a major and a minor portion of glass, said portions being of contrasting color, the minor portion having a dimension and location limited with reference to the bubble to be formed in the glass when comprising both portions, forming a bubble in said glass close to said minor portion and then simultaneously extending the united major and minor glass portions in such a manner that said minor portion shall, during the extension of both portions, be caused to occupy a position closely adjacent to one side of the bore and be of a continuing width, not differing substantially from that of the said bore, while the edges of said minor portion are joined to and bound on both sides by the glass of said major portion.

2. In the process of making thermometer tubing, the step which consists in applying to the end of a blow pipe a minor glass portion and an associated major portion of glass of contrasting color and blowing through said blow pipe to form a bubble close to said minor glass portion and then extending the united major and minor glass portions in such a manner that said minor portion shall, during the extension of both portions, be caused to occupy a position closely adjacent to one side of the bore and be of a continuing width, not substantially wider than said bore, while the edges of said minor portion are joined to and bound on both sides by the glass of said major portion.

3. A process of making tubing for thermometers or the like which comprises arranging a quantity of colored glass upon the end of a blow pipe or pontil, forming a gather of clear glass over said colored glass, producing a bubble in the gather, said bubble and gather being formed elongated and covered with a light shield, in such a manner so as to bring the colored member between the bore and the light shield and at the opposite side of the bore from the observation side of the thermometer.

4. A process of making tubing for thermometers or the like which comprises arranging a quantity of colored glass upon the end of a blow pipe or pontil, forming a gather of differently colored glass upon said blow pipe and to include said first mentioned glass, producing a bubble in the gather, causing the first colored glass to assume a position closely adjacent to said bubble and thereafter blowing and drawing said glass to the desired length and shape while retaining the colored glass in fixed relation to the bubble and in pre-determined and approximate width in relation to the bore, resulting from said bubble and at the side thereof opposite the observation side of said tube.

5. A process of making tubing for thermometers or the like which comprises arranging a quantity of glass upon the end of a blow pipe or pontil, forming a gather or differently colored glass over the end of said pontil and the glass thereon, producing a bubble in the gather, causing the colored glass to assume a position closely adjacent to said bubble and at the side thereof opposite to that wherein the lens will later be produced and thereafter forming said lens and blowing and drawing said glass to the desired length while retaining the colored glass adjacent to the bubble and in pre-determined width and position in relation to the bore, resulting from said bubble.

6. The process of making thermometer tubing which consists of placing a quantity of colored glass upon a blow pipe or pontil, forming a gather of clear, transparent glass thereover and thereafter gathering a quantity of clear glass upon said first mentioned clear glass and said colored glass, forming a bubble in the combined mass, drawing and shaping said mass in a straight line, to retain the colored glass in approximately definite relation to the bubble and always at one side thereof and forming a lens in said drawn glass at the side of said bubble opposite to that wherein the colored strip is arranged.

7. The method of making striped tubing, which consists in attaching a mass of colored glass to the end of a blowpipe, imparting to the colored glass a cross-section of meniscus shape, gathering clear glass therearound, blowing a cavity in the glass, elongating both the glass and the cavity, and drawing out the blank thus formed into tubing of the desired cross-section.

8. The method of making tubing which has a colored stripe forming part of the bore, which comprises the steps of attaching a piece of colored glass directly to the end of the blow-pipe in such a manner that the colored glass is adjacent to, and to one side only of the hole in the blow-pipe, gathering clear glass there-around, blowing a cavity in the glass on the pipe with the colored glass along one side of the cavity only, and forming the blank thus made into a tube.

Signed at the city, county and State of New York, this 19th day of December, 1923.

ALFRED T. HESPE.